US012477196B1

(12) United States Patent
Goyal et al.

(10) Patent No.: US 12,477,196 B1
(45) Date of Patent: Nov. 18, 2025

(54) AI-BASED VIDEO SUMMARY GENERATION FOR CONTENT CONSUMPTION

(71) Applicant: Microsoft Technology Licensing, LLC, Redmond, WA (US)

(72) Inventors: Shubham Goyal, Calgary (CA); Ron Mondri, Seattle, WA (US); Itai Almog, Redmond, WA (US); Dhruv Kochhar, Ottawa (CA); Jairo Medina Garcia, Redmond, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/667,654

(22) Filed: May 17, 2024

(51) Int. Cl.
*H04N 21/8549* (2011.01)
*H04N 21/431* (2011.01)

(52) U.S. Cl.
CPC ..... *H04N 21/8549* (2013.01); *H04N 21/4318* (2013.01)

(58) Field of Classification Search
CPC .............. H04N 21/4318; H04N 21/8549
See application file for complete search history.

(56) References Cited

U.S. PATENT DOCUMENTS

| | | | | |
|---|---|---|---|---|
| 7,068,789 | B2 * | 6/2006 | Huitema | H04L 63/1458 713/168 |
| 7,614,069 | B2 * | 11/2009 | Stone | H04N 21/25435 725/89 |
| 7,650,624 | B2 * | 1/2010 | Barsoum | H04N 7/081 725/23 |
| 7,721,313 | B2 * | 5/2010 | Barrett | H04N 21/4334 725/89 |
| 7,813,822 | B1 * | 10/2010 | Hoffberg | H04N 7/163 381/73.1 |
| 8,032,911 | B2 * | 10/2011 | Ohkita | H04L 61/5038 725/74 |
| 8,121,706 | B2 * | 2/2012 | Morikawa | H04L 12/2814 725/74 |

(Continued)

OTHER PUBLICATIONS

"YouTube video of: Microsoft Loop—Page Summary and Ask Question", Retrieved from: the Internet: <<https://www.youtube.com/watch?v=LdBal1LyyCs&t=28s>>, 2023, 1 Page.

*Primary Examiner* — Michael B. Pierorazio
(74) *Attorney, Agent, or Firm* — NovoTechIP International PLLC

(57) ABSTRACT

A data processing system implements receiving content and a call requesting a generative model to generate a video summary of the content; constructing a prompt including the content and instructions to the model to identify semantic context of the content, to identify a text data item, an audio data item, and/or a video data item embedded in the content to generate a text transcript of the audio data item and/or the video data item, or a textual description of the video data item, to summarize the text data item, the text transcripts, and/or the textual description as a summary of the content based on the semantic context, and to generate the video summary based on the summary and a portion of the text data item, the audio data item, and/or the video data item; providing the first prompt to the generative model; providing the video summary to a client device for presentation.

20 Claims, 9 Drawing Sheets

(56) References Cited

U.S. PATENT DOCUMENTS

| | | | | |
|---|---|---|---|---|
| 8,949,923 B2* | 2/2015 | Muvavarirwa | H04N 21/4108 | 370/332 |
| 2003/0056093 A1* | 3/2003 | Huitema | H04L 67/104 | 713/156 |
| 2004/0117856 A1* | 6/2004 | Barsoum | G06Q 30/0207 | 348/E7.071 |
| 2005/0216942 A1* | 9/2005 | Barton | H04N 21/6125 | 348/E7.071 |
| 2005/0283815 A1* | 12/2005 | Brooks | H04H 20/78 | 725/127 |
| 2005/0289632 A1* | 12/2005 | Brooks | H04N 7/17309 | 725/127 |
| 2006/0010481 A1* | 1/2006 | Wall | H04N 7/163 | 725/151 |
| 2006/0165379 A1* | 7/2006 | Agnihotri | G06F 16/735 | 348/E7.071 |
| 2006/0212197 A1* | 9/2006 | Butler | B60R 11/0235 | 701/1 |
| 2006/0225105 A1* | 10/2006 | Russ | H04N 7/17318 | 348/E7.071 |
| 2007/0050822 A1* | 3/2007 | Stevens | H04N 7/14 | 725/74 |
| 2007/0079341 A1* | 4/2007 | Russ | H04N 21/43615 | 725/89 |
| 2007/0101185 A1* | 5/2007 | Ostrowka | H04N 21/4334 | 714/6.13 |
| 2007/0130601 A1* | 6/2007 | Li | H04N 21/6405 | 725/112 |
| 2007/0157281 A1* | 7/2007 | Ellis | H04N 21/4147 | 725/74 |
| 2008/0013919 A1* | 1/2008 | Boston | G11B 19/00 | |
| 2008/0022330 A1* | 1/2008 | Barrett | H04N 21/8352 | 725/89 |
| 2008/0022331 A1* | 1/2008 | Barrett | H04N 21/6125 | 725/89 |
| 2008/0022332 A1* | 1/2008 | Barrett | H04N 21/4227 | 725/89 |
| 2008/0155615 A1* | 6/2008 | Craner | H04N 7/17318 | 348/E7.071 |
| 2008/0235587 A1* | 9/2008 | Heie | H04N 7/142 | 709/231 |
| 2008/0235733 A1* | 9/2008 | Heie | H04N 21/482 | 725/46 |
| 2009/0162032 A1* | 6/2009 | Patel | H04N 21/8355 | 386/353 |
| 2010/0107186 A1* | 4/2010 | Varriale | H04H 60/23 | 455/410 |
| 2010/0125876 A1* | 5/2010 | Craner | H04N 21/4331 | 725/37 |
| 2010/0263013 A1* | 10/2010 | Asakura | H04N 21/443 | 725/116 |
| 2010/0296487 A1* | 11/2010 | Karaoguz | H04W 36/04 | 370/332 |
| 2010/0313225 A1* | 12/2010 | Cholas | H04N 21/4402 | 725/62 |
| 2010/0313226 A1* | 12/2010 | Cholas | H04N 21/25875 | 725/98 |
| 2011/0066744 A1* | 3/2011 | Del Sordo | H04N 21/4305 | 709/231 |
| 2011/0086619 A1* | 4/2011 | George | H04M 1/72415 | 455/414.1 |
| 2011/0103374 A1* | 5/2011 | Lajoie | H04L 65/612 | 370/352 |
| 2011/0107364 A1* | 5/2011 | Lajoie | H04L 65/1023 | 370/352 |
| 2011/0107379 A1* | 5/2011 | Lajoie | H04L 65/611 | 725/151 |
| 2011/0191810 A1* | 8/2011 | Thomas | H04N 7/106 | 725/78 |
| 2012/0230649 A1* | 9/2012 | Craner | H04N 21/4424 | 386/230 |
| 2013/0198787 A1* | 8/2013 | Perry, II | H04N 21/2585 | 725/86 |
| 2017/0109584 A1* | 4/2017 | Yao | H04N 21/4666 | |
| 2018/0150704 A1* | 5/2018 | Lee | G06V 20/58 | |
| 2019/0108618 A1* | 4/2019 | Hwang | G06T 3/4046 | |
| 2019/0222891 A1* | 7/2019 | Shen | H04N 21/25875 | |
| 2024/0406478 A1* | 12/2024 | Hsu | H04N 21/4784 | |

\* cited by examiner

AI-BASED VIDEO SUMMARY GENERATION FOR CONTENT CONSUMPTION

BACKGROUND

Modern life is busy and demanding with many different types of personal and work information. Daily content consumption is a powerful tool for both learning and working. Common strategies to improve the time required for content consumption include summarizing content information. Artificial intelligence (AI) has been used to automate our lives to save time and increase productivity. However, the existing AI content summarization solutions primarily provide summarization in text. While such summaries are useful for many users, for users who are visual thinkers and learners, textual summaries may not be helpful. Moreover, there are technical challenges to realize AI-based video summary generation, such as accurately summarizing content, processing the content data in real-time, and the like. Hence, there is a need for providing systems and methods of AI-based video summary generation for content consumption.

SUMMARY

An example data processing system according to the disclosure includes a processor and a machine-readable medium storing executable instructions. The instructions when executed cause the processor alone or in combination with other processors to perform operations including receiving, via a client device, digital content and a call requesting a generative model to generate a video summary of the digital content, wherein the digital content includes any of text, audio, or video; constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item; providing, via the prompt construction unit, as an input the first prompt to the generative model and receiving as an output the video summary of the digital content from the generative model; providing the video summary to the client device; and causing a user interface of the client device to present the video summary.

An example method implemented in a data processing system includes receiving, via a client device, digital content and a call requesting a generative model to generate a video summary of the digital content, wherein the digital content includes any of text, audio, or video; constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item; providing, via the prompt construction unit, as an input the first prompt to the generative model and receiving as an output the video summary of the digital content from the generative model; providing the video summary to the client device; and causing a user interface of the client device to present the video summary.

An example non-transitory computer readable medium data processing system according to the disclosure on which are stored instructions that, when executed, cause a programmable device to perform functions of receiving, via a client device, digital content and a call requesting a generative model to generate a video summary of the digital content, wherein the digital content includes any of text, audio, or video; constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item; providing, via the prompt construction unit, as an input the first prompt to the generative model and receiving as an output the video summary of the digital content from the generative model; providing the video summary to the client device; and causing a user interface of the client device to present the video summary.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
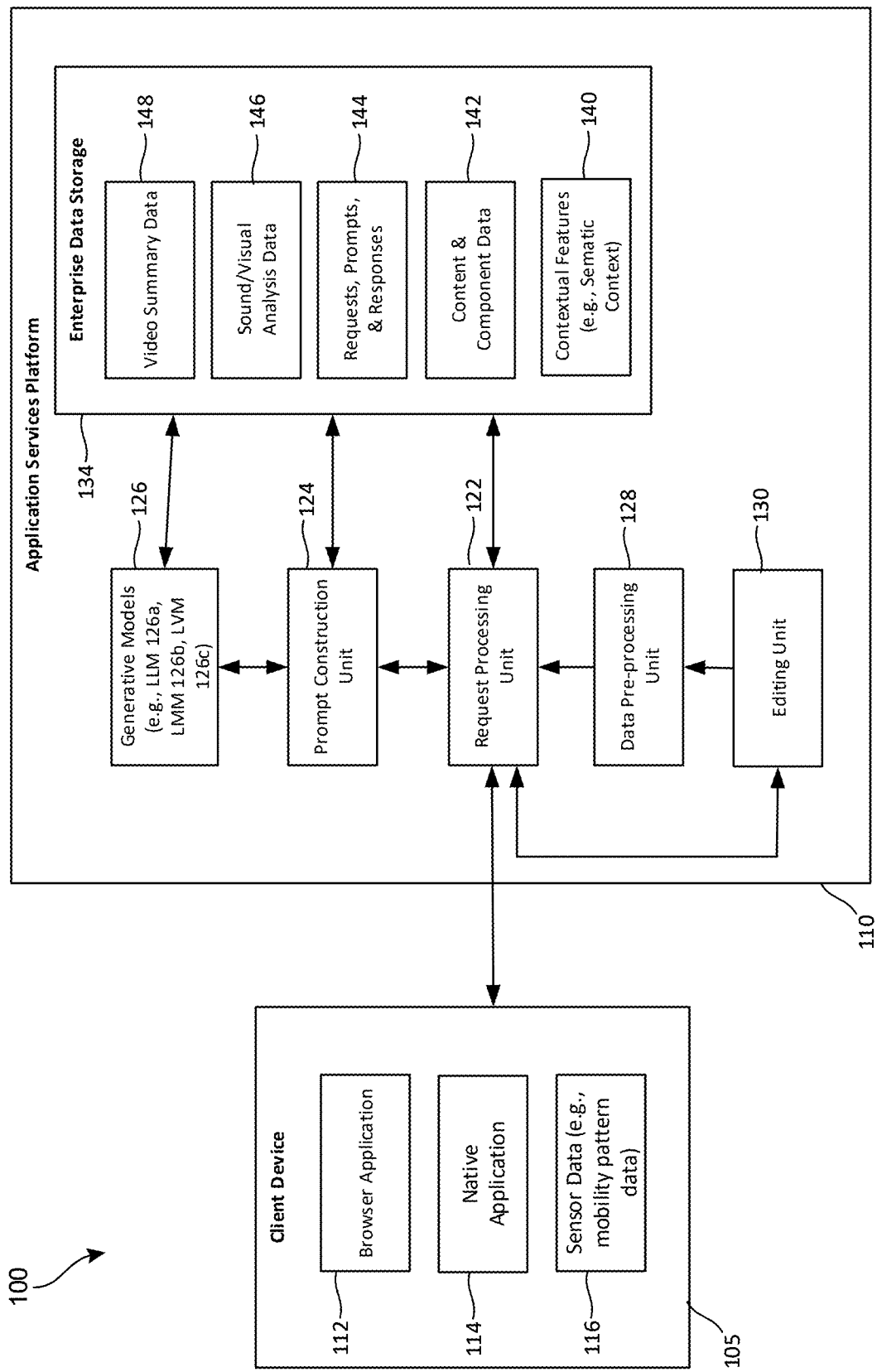
FIG. 1 is a diagram of an example computing environment in which the techniques for providing AI-based video summary generation are implemented.

Systems and methods for using generative AI for video summary generation of content are described herein. These techniques provide a technical solution to the technical problems of accurately summarizing content in a video, processing content data in real-time, and the like. The existing AI-based content summarization provide textual summaries. For example, PowerPoint® offers a function of summarizing a presentation in text. As another example, Copilot® can generate a textual summary of a Teams® meeting as bullet points with links to the information source. However, according to user research data, the majority of the human population are visual thinkers and learners. Therefore, visualized content summaries, especially in the form of small, short videos (such as TikTok® & YouTube® shorts) are easier for users to consume.

An AI-based video summary of content not only can save users' time to consume information, but can also increase users' understanding of the information. The proposed system improves video summary creation of content by dividing the content into different data type components (e.g., text, audio, video, or the like), and applying generative model(s) to differentially process the different data type components to extract key information (e.g., keywords, key points, key sentences, key audio sections, key scenes, and the like), thereby generating a text summary, an audio summary, and/or a visual summary based on the extracted key information. These summaries are used to generate a video summary of the content using a generative vision model (e.g., a large vision model, such as Sora) or a large multimodal model (LMM). The system can automatically retrieve and convert different content components into a desired format to extract summary of different data types.

In one embodiment, different content data types from various sources is standardized and/or tokenized (e.g., using open-domain semantic labeling, ODSL) before feeding into the generative models 126 as grounding data. In addition, the system uses the summary of different data types as inputs to a generative vision model, in order to create a video summary of the content, for user visual consumption of the content.

In another embodiment, the system summarizes multimedia content as a video summary." The system generates the video summary of the multimedia input to enable visual consumption of the content. For instance, the multimedia content includes documents, meeting summaries, and whiteboard ideated content. The system extracts and/or infers key words/phrases/sentences from a variety of textual information, e.g., a text component (e.g., Teams® chat) of content (e.g., a Teams® meeting), text transcripts (e.g., Teams® meeting transcript) of audio/video components of the content, visual portion of the video component (e.g., Teams® meeting video) of the content, and the like, and then uses the extracted content to generate a video summary that can display text, spreadsheet, chart, report, audio, image, video, and the like therein.

An aspect of the system includes a canonical user experience for the user to change/edit images, audio, and to enable the user to interact with the summary by taking actions on key information and points in the summary video. A further aspect of the system includes an architecture for providing the video summarization feature, where the system interacts with various large language models (LLMs), such as Dalle-E for image generation and Sora, thereby creating scenes from text content component, transcript and/or description for the video summary.

A technical benefit of the approach provided herein is the video summary of content generated by generative models is more comprehensive and accurately represents the content. This result not only improves the productivity of the user, but also decreases the resource consumption required to refine the video summary of content. The video summary of content generated by a generative language model based on contextual features (e.g., semantic context) extracted from metadata, sensor data, and the like summarizes the content better than a system that does not consider the contextual features.

Another technical benefit of this approach is applying a text-to-image generative model (e.g., Dall-E) to efficiently and creatively visualize still images as the summary of the content, and/or a large vision generative model (e.g., Sora) to efficiently and creatively generate a video summary of the content.

Another technical benefit of this approach is the automated generation of a video summary of content in various data types/formats, and doing so in a way that takes the relevant contextual information into account when summarizing the content. In particular, the approach builds a data pipeline that can securely filter the content across different sources and ground them to generative models.

Yet, another technical benefit of this approach is providing user interfaces that allow users to interact with the system to edit the video summaries of content, provide feedback, and re-generate video summaries of the content based on the feedback. These and other technical benefits of the techniques disclosed herein will be evident from the discussion of the example implementations that follow.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to video summary generation applications, presentation applications, website authoring applications, collaboration platforms, communications platforms, and/or other types of applications in which users may create, view, and/or modify video summaries of content. In the implementation shown in FIG. 1, the application services platform 110 also applies generative AI to generate fast and concise video summaries of content upon user demand, according to the techniques described herein. In one embodiment, the application services platform 110 is independently implemented on the client device 105. In another embodiment, the client device 105 and the application services platform 110 communicate with each other over a network (not shown) to implement the system. The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

As used herein, the term "content" refers refer to any information that exists in a format that can be processed by computers. Examples include text documents, images, audio files, videos, software applications, websites, social media posts, and the like. Although various embodiments are described with respect to digital content, it is contemplated that the approach described herein may be used with paper content or content embedded in other physical storage media other than paper, which require pre-processing to convert into a digital form.

The client device 105 includes a native application 114 and a browser application 112. The native application 114 is a web-enabled native application, in some implementations, which enables users to view, create, and/or modify video summaries of content. The web-enabled native application utilizes services provided by the application services platform 110 including but not limited to creating, viewing, and/or modifying various types of video summaries of content and obtaining content data source(s) for creating and/or modifying the video summaries of content. The native application 114 implements a user interface 305 shown in FIGS. 3A-3B in some implementations. In other implementations, the browser application 112 is used for accessing and viewing web-based content provided by the application services platform 110. In such implementations, the application services platform 110 implements one or more web applications, such as the browser application 112, that enables users to view, create, and/or modify video summaries of content and to obtain content data for creating and/or modifying video summaries of content. The browser application 112 implements the user interface 305 shown in FIGS. 3A-3B in some implementations. The application services platform 110 supports both the native application 114 and the browser application 112 in some implementations, and the users may choose which approach best suits their needs.

In one embodiment, the application services platform 110 includes a request processing unit 122, a prompt construction unit 124, generative models 126, a data pre-processing unit 128, and an editing unit 130. In other embodiments, the application services platform 110 also includes an enterprise data storage 134, and moderation services (not shown).

The request processing unit 122 is configured to receive requests from the native application 114 and/or the browser application 112 of the client device 105. The requests may include but are not limited to requests to create, view, and/or modify various types of video summaries of content and/or sending natural language prompts to a generative model 126 to generate a video summary of content according to the techniques provided herein. The request processing unit 122 also coordinates communication and exchange of data among components of the application services platform 110 as discussed in the examples which follow.

In one embodiment, the generative models 126 include a generative model trained to generate content (e.g., textual, spreadsheet, chart, report, audio, image, video, and the like) in response to natural language prompts input by a user via the native application 114 or via the web. For instance, the generative models 126 are implemented using a large language model (LLM) in some implementations. Examples of such models include but are not limited to a Generative Pre-trained Transformer 3 (GPT-3), or GPT-4 model. Developing an AI model capable of accurately summarizing content in videos requires training on large and diverse datasets, thereby ensuring that the generated video summaries are relevant and accurately reflect the content of interest. Other implementations may utilize machine learning models or other generative models to generate a video summary of content according to contextual features of the content and/or preferences of a user. In terms of video creation, the system can leverage Sora or similar models, and ground them with relevant data.

In one scenario, the AI-based video summary generation pipeline can create a video summary of ideated content on Whiteboard® generated by a marketing team of a pharmaceutical company. Microsoft Whiteboard® meetings are designed to be collaborative brainstorming sessions, and the outputs can vary depending on the meeting's purpose. Microsoft Whiteboard® itself does not have a native file format to save the entire collaborative workspace. However, it offers two main export options for capturing the Whiteboard® content: Portable Network Graphic (PNG) images and Scalable Vector Graphics (SVG) images.

In an example, the marketing team leverages Whiteboard® to co-create the marketing plan for the upcoming season. The team then adds a "Topic Brainstorm" template and ideates using notes/text captured in a meeting chat, and other canvas object types. The board facilitator of the meeting invokes a "summarize as video" functionality from a Copilot® interface (either from the chat or from a contextual UI).

In one embodiment, the request processing unit 122 receives the user request to generate a video summary of the content from the native application 114 or the browser application 112. For instance, the user request is a natural language prompt input by the user which is then passed on to the prompt construction unit 124. For example, the user request is expressed in a user prompt: "help me generate a video summary of the upload content," or "I want to use ChatGPT to summarize the Whiteboard® content in a video."

The generative models 126 ground on the whiteboard content to create a draft video summary. For example, the natural language prompt calls a LLM 126a to process different data type components of the content to get text and/or audio summary of the content, and then call a LMM 126b or a LVM 126c to generate a video summary of the content based on the outputs from the LLM 126a. A meta prompt for the LLM 126a may imply or indicate that the user would like to have the different data type components of the content processed differently as described in the AI-based video summary generation pipeline 200 in FIGS. 2A-2B.

Once the prompt construction unit 124 interprets that the user prompt is for generating a video summary of the content, the prompt construction unit 124 can formulate meta-prompt(s) for generating a video summary of the content. The prompt construction unit 124 can divide different data type components of the content (e.g., notes that have reactions), and selectively choose data type(s) to generate text/audio summaries for generating the video summary (see Table 1).

TABLE 1

Generate a video summary using only those notes that have reactions.
Summarize content as a 1-min video with sections corresponding
to key highlights, lowlights & conclusion.

The draft video summary can be presented to the user for editing (e.g., by adding comments, annotations, reactions, etc.). Once the edits are done, the user can publish the video summary, for example, which may be inserted as a Stream® Loop® component on the Whiteboard®. In this case, the system can publish/paste the Stream® Loop® component to other Loop hosts, such as Teams® chats/channels, Outlook® mails, Loop® App, and the like.

Figure 2A:
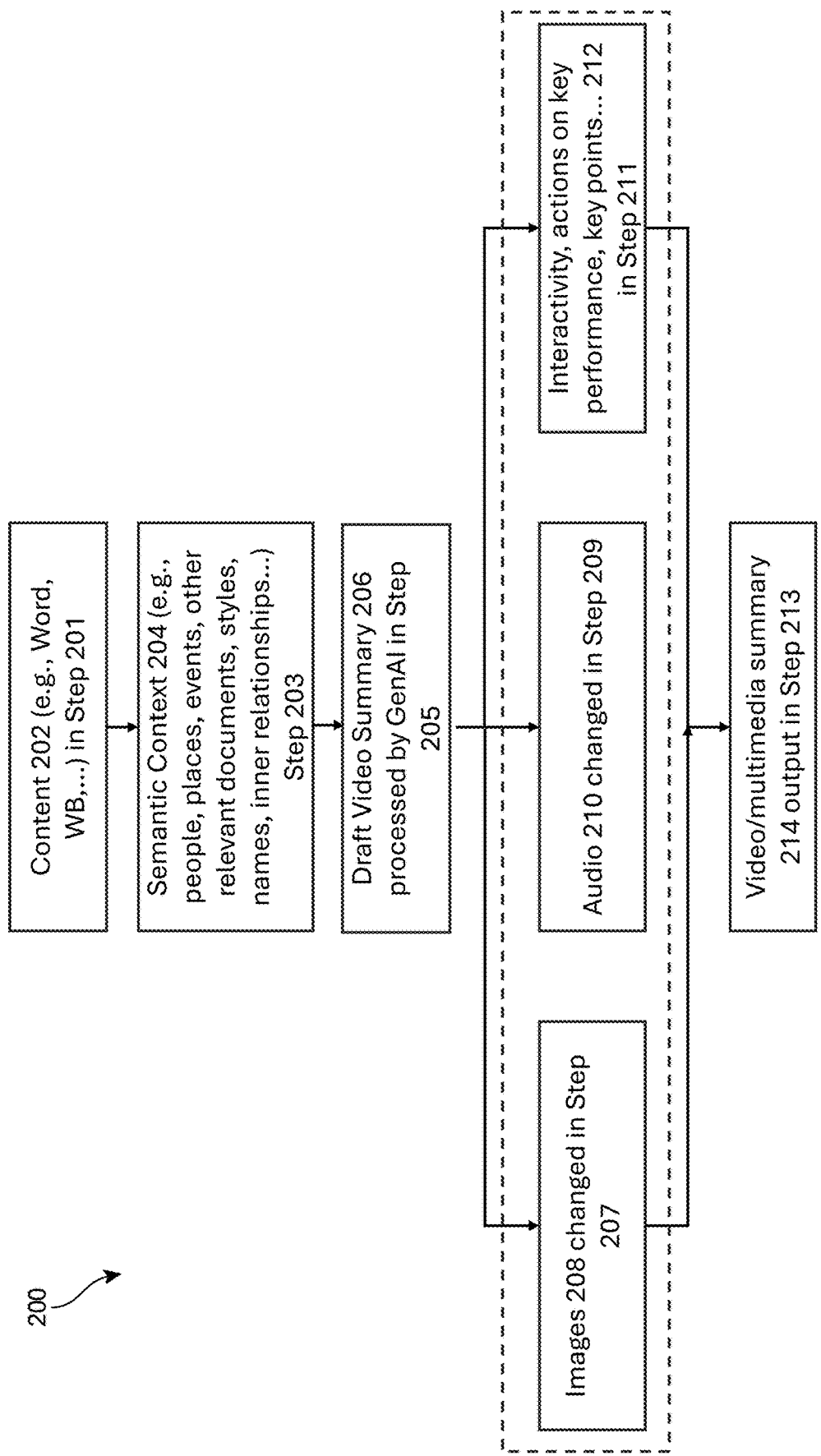
FIGS. 2A-2B are conceptual diagrams of an AI-based video summary generation pipeline of the system of FIG. 1 according to principles described herein.
Figure 2B:
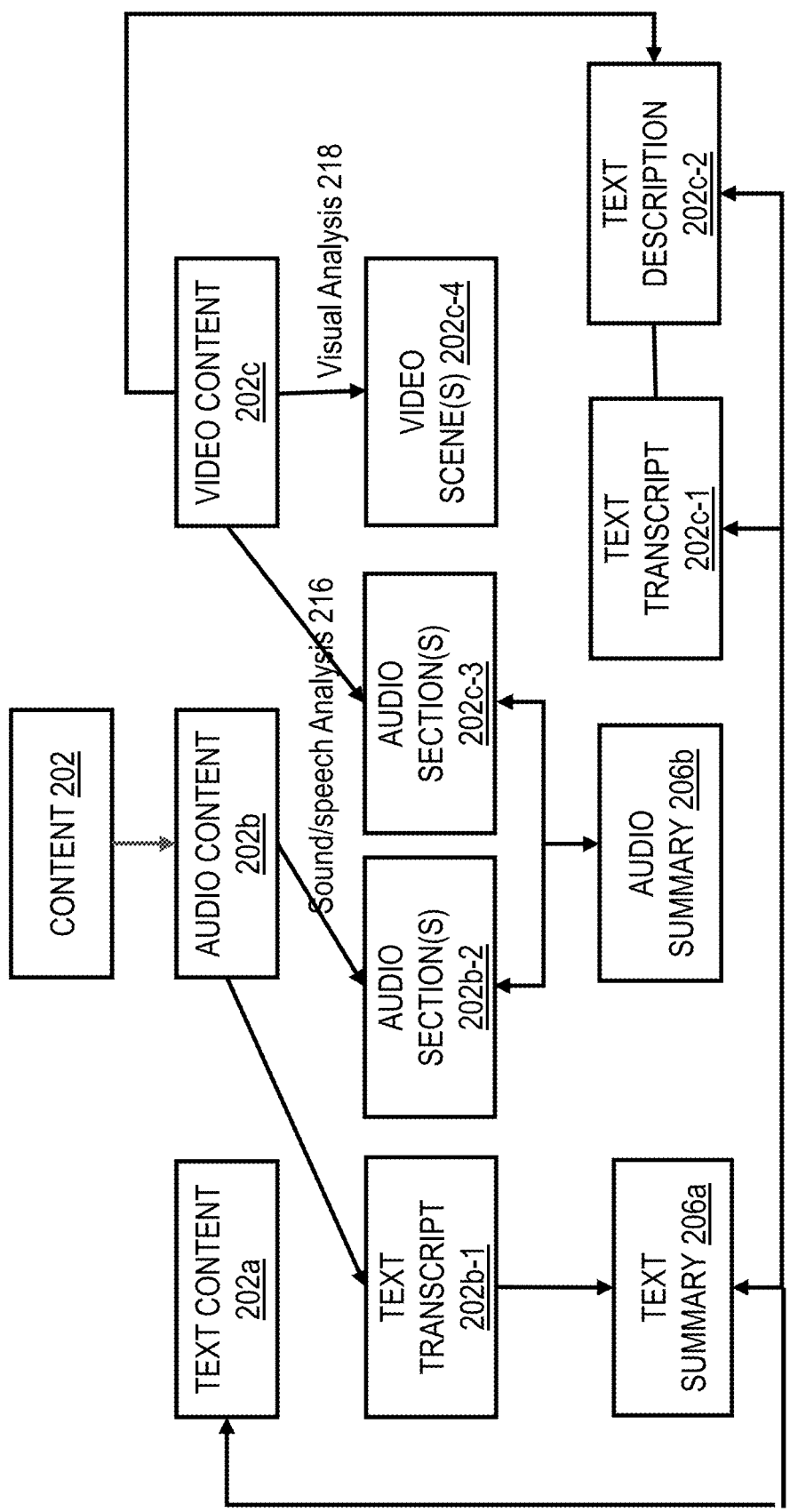

FIGS. 2A-2B are conceptual diagrams of an AI-based video summary generation pipeline 200 of the system of FIG. 1 according to principles described herein. FIG. 2A shows the pipeline 200 for converting a media content input into a video/multimedia summary. For example, the client device 105 has a document open thereon, and the content 202 in the document is used for grounding AI outputs in Step 201. There are two main ways to ground/connect the AI outputs to sources of information. One is data source access and the other is prompt engineering. These methods tether the AI's creations to reality thereby reducing the chances of AI hallucination.

In addition to the explicit grounding, the pipeline 200 applies implicit grounding (e.g., via Sydney®, an AI chatbot) to add additional contextual features (including semantic context 204) to the AI-model inputs in Step 203. Implicit grounding refers to the ability of a generative AI model to understand and reference the real world without being explicitly programmed about it. This means the model learns the semantic context 204 (e.g., people, places, events, other relevant attributes), styles, names, inner relationships, and the like) of the content 202 through its training data and interactions.

Alternatively, the pipeline 200 can extract the semantic context 204 (e.g., topic/title, speakers, audience, and the like) of the content 202 from the metadata of the content. Taking a word document as an example, the document can include several types of metadata, such as document details (e.g., title, author/creator, subject, keywords, and the like), document creation and history (e.g., the date the document was created, the last modified date and time, the total editing time spent on the document, comments and track changes, custom properties defined by users, template information, etc.), and the like.

Audio files can hold metadata that helps identify, organize, and recommend the audio content, such as basic information (e.g., artist name, album title, track title, track number, and release date), genre (e.g., rock, pop, classical, etc.), composer/writer credits, album artwork (e.g., cover art for the album the audio file belongs to, copyright information, licensing, mood/energy, and the like), lyrics, and the like. This metadata is typically stored within the audio file itself using tags like ID3v1 and ID3v2. Not all audio formats support extensive metadata tagging, yet popular formats like MP3 and WAV do.

Video files carry video metadata similar to audio files including the basic information and actors, directors, location filming (e.g., geotags), non-human characters in the video (e.g., for animation or gaming content), file format and size (e.g., MP4, AVI), video and audio codecs, resolution and frame rate, copyright and licensing, ratings and restrictions, chapter markers, and the like.

In one embodiment, the AI-based video summary generation pipeline 200 builds a data pipeline that can securely filter the content across different sources and ground them to the generative models 126. In one embodiment, the data pipeline builds a staging area to collect data across different applications that could be relevant for a use case. The data pipeline also builds a data streaming system apt to speed up the process. The data is tokenized before being fed it to the LLM 126a. As such, the AI-based video summary generation pipeline 200 can integrate the LLM 126a with various sources of input data, such as documents, meeting transcripts, and recordings. For example, Copilot AutoGen can assist a process of data cleansing.

In another embodiment, the AI-based video summary generation pipeline builds n data orchestration system based on AutoGen®, where each Agent covers specific sources of input data (i.e. each one of the app-specific data sources, integration with App Chat Copilot®), and deploys respective LLMs and tools (e.g., sound/speech analysis tools, visual analysis tools, and the like). AutoGen® is an open-source, community-driven project that provides a multi-agent conversation framework as a high-level abstraction. The AI-based video summary generation pipeline 200 applies handoff implementation for each specific application so that the application can communicate properly with a respective Agent from the AutoGen-based orchestration framework.

In one embodiment, the AI-based video summary generation pipeline 200 uses a cloud storage service/platform (e.g., Stream®, a corporate video-sharing service) as a standard for creating video content. Taking a virtual work meeting (e.g., via Teams®) as an example, the pipeline 200 uses a meeting recording in Stream®, leverages Stream® for video summary creation, and stores the video summary (e.g., in OneDrive® and SharePoint®). Further, the pipeline 200 can leverage an online collaboration application (e.g., Loop®) component for Stream® to easily port and edit the video summary across different applications (e.g., applications of M365® suite).

In another embodiment, the pipeline 200 can extract the semantic context of the content 202 from sensor data 116 of the client device 105. (e.g., user mobility pattern data collected by a GPS receiver of the client device 105). For example, the pipeline 200 can retrieve sensor data that indicates the user sang and recorded a discussion at an airport terminal from 5:00-5:30 pm without saying the location and the timing. The location and timing data can be the semantic context to be incorporated in a video summary of the discussion.

In step 205, a preliminary/draft video summary 206 is created. The user has the ability to change/edit image(s) 208 of the draft video summary 206 in Step 207, change/edit audio 210 of the draft video summary 206 in Step 209, and/or interact (through comments, annotations, etc. 212) with the draft video summary 206 in Step 211. Upon user confirmation, the video summary 214 is published in Step 213.

FIG. 2B shows data processing details of the process for generating the draft video summary 206. For example, the pipeline 200 divides the content 202 into three components:

text content 202a, audio content 202b, and video content 202c. The content 202 may contain one or more of these components, as well as other data types such as spreadsheet, chart, and the like.

When the content 202 contains only the text content 202a (e.g., a Word document), the pipeline 200 can apply an LLM or LMM and a meta prompt (e.g., Table 2) to summarize the text, or to summarize the text further based on the semantic context 204 (e.g., details pertaining to contributors, reviewers, key sections and important insights) to get a text summary 206a. The pipeline 200 then sends the text summary 206a to a LVM (e.g., Sora) or the LMM to generate the draft video summary 206.

TABLE 2

Create a video summary from the Word document titled [Document_Name] while including details pertaining to contributors, reviewers, key sections & important insights.

When the content 202 contains only the audio content 202b, the AI-based video summary generation pipeline 200 can apply the LLM/LMM on the audio content 202b to generate a text transcript 202b-1, and to summarize the text transcript 202b-1 to get a text summary 206a. The pipeline 200 can summarize the text transcript 202b-1 further based on the semantic context 204 to get a text summary 206a. The pipeline 200 then sends the text summary 206a to the LVM (e.g., Sora) or the LMM to generate the draft video summary 206.

Concurrently or alternatively, the AI-based video summary generation pipeline 200 can apply sound/speech analysis 216 (via machine learning models and/or generative models) on the audio content 202b to generate key audio section(s) 202b-2. In one embodiment, the sound/speech analysis 216 is based on tone, intonation, pitch, volume, speaking rate for emphasis, and the like to determine the key audio section(s) 202b-2. For example, the sound/speech analysis 216 chooses a loud and long comment as a key audio section to include in the draft video summary 206. The pipeline 200 then sends the text summary 206a and the the key audio section(s) 202b-2 to the LVM/LMM to generate the draft video summary 206.

In another instance, the sound/speech analysis 216 further includes considering the semantic context 204 to get key audio section(s) 202b-2. For example, the sound/speech analysis 216 chooses a boss's comment as a key audio section to include in the draft video summary 206. The AI-based video summary generation pipeline 200 then sends the text summary 206a and the the key audio section(s) 202b-2 to the LVM/LMM based on a meta prompt (e.g., Table 3) to generate the draft video summary 206 further based on the semantic context 204 such as speaker, audience, speaking rate, tone, volume and intonation.

TABLE 3

Create a video summary using the audio & transcript from the meeting titled [Meeting_Name]. Rank sections in the video output based on speaker, audience, speaking rate, tone, volume & intonation.

When the content 202 contains only the video content 202c, the AI-based video summary generation pipeline 200 can apply the LLM/LMM on the video content 202c to generate a text transcript 202c-1 and/or a text description 202c-2. The text transcript 202c-1 can be extracted from the audio portion of the video content 202c. The text description 202c-2 can be a text summary of the text transcript 202c-1, and/or a direct visual summary of the video content 202c based only on the visual portion of the video content 202c. The AI-based video summary generation pipeline 200 can apply the LLM/LMM to summarize the text transcript 202c-1 and/or the text description 202c-2 to get a text summary 206a. The pipeline 200 then sends the text summary 206a to the LVM/LMM to generate the draft video summary 206.

By analogy, the AI-based video summary generation pipeline 200 can apply the sound/speech analysis 216 on the audio portion of the video content 202c to generate key audio section(s) 202c-3, then processes the key audio section(s) 202c-3 as does to key audio section(s) 202b-2. The pipeline 200 then sends the text summary 206a and the key audio section(s) 202c-3 to the LVM/LMM to generate the draft video summary 206.

Concurrently or alternatively, the AI-based video summary generation pipeline 200 can apply visual analysis 218 on the visual portion of the video content 202c to determine key scene(s) 202c-4. In one embodiment, the visual analysis 218 is based on color, motions, objects, people, and the like to determine the key scene(s) 202c-4. The pipeline 200 then sends the text summary 206a and the key scene(s) 202c-4 to the LVM/LMM to generate the draft video summary 206. Alternatively, the pipeline 200 then sends the text summary 206a, key audio section(s) 202c-3, and the the key scene(s) 202c-4 to the LVM/LMM based on a meta prompt (e.g., Table 4) to generate the draft video summary 206 based on the semantic context 204 such as audience, overall participation, meeting duration, participant sentiment and number, and priority of key follow-ups.

TABLE 4

Create a video summary using the meeting video recordings & transcripts of the last 10 instances of the meeting series titled [Meeting_Series_Name]. Rank the scenes in the summary based on audience, overall participation, meeting duration, participant sentiment & number + priority of key follow-ups.

When the content 202 contains both the text content 202a and the audio content 202b, the AI-based video summary generation pipeline 200 can summarize the text content 202a and the text transcript 202b-1 to get a text summary 206a. The pipeline 200 then sends the text summary 206a and/or the key audio section(s) 202b-2 to the LVM/LMM to generate the draft video summary 206.

When the content 202 contains both the text content 202a and the video content 202c, the AI-based video summary generation pipeline 200 can summarize the text content 202a, the text transcript 202c-1, and/or the text description 202c-2 to get a text summary 206a. The pipeline 200 then sends the text summary 206a, the key audio section(s) 202c-3, and/or the key scene(s) 202c-4 to the LVM/LMM to generate the draft video summary 206. In another scenario, the pipeline creates a video/text summary for a Teams meeting. A team of product managers met for a visual collaboration product to discuss and analyze its lifecycle metrics. The team co-analyzed various usage and retention metrics for the product for different platforms while forming hypothesis and jotting down next steps.

To ensure follow-ups, the team lead invokes Teams® Copilot® to recap the meeting. The Teams® Copilot® applies a generative model and the meta prompt listed in Table 5 to leverage the meeting transcript as well as the meeting video recording to generate a multi-media summary that includes meeting recording snippets accompanying each text-based bullet point based on the semantic context 204 such as key callouts by leadership. The bullet points and the meeting recording video snippets can be in separate files or combined into one video. The team then shares the summary output(s) with others as required.

TABLE 5

Recap the meeting highlighting key callouts by leadership.
Summarize the key highlights & takeaways from the meeting.

When the content 202 contains both the audio content 202b and the video content 202c, the AI-based video summary generation pipeline 200 can summarize the text transcript 202b-2, the text transcript 202c-1, and/or the text description 202c-2 to get a text summary 206a. The pipeline 200 can also summarize the key audio section(s) 202b-2 and the key audio section(s) 202c-3 to get an audio summary 206b. The pipeline 200 then sends the text summary 206a, the audio summary 206b, and/or the key scene(s) 202c-4 to the LVM/LMM to generate the draft video summary 206.

When the content 202 contains all of the text content 202a, the audio content 202b and the video content 202c, the AI-based video summary generation pipeline 200 can summarize the text content 202a, the text transcript 202b-2, the text transcript 202c-1, and/or the text description 202c-2 to get a text summary 206a. The pipeline 200 can also summarize the key audio section(s) 202b-2 and the key audio section(s) 202c-3 to get an audio summary 206b. The pipeline 200 then sends the text summary 206a, the audio summary 206b, and/or the key scene(s) 202c-4 to the LVM/LMM to generate the draft video summary 206.

Beside standard text, audio, video formats, the AI-based video summary generation pipeline 200 can summarize other data types such as spreadsheet, chart, and the like. For instance, CSV (Comma-Separated Values) stores tabular data like spreadsheets, each row represents a record, and commas (or other delimiters) separate values within a row. In another scenario, the pipeline 200 creates one or more video summaries for a user's work week, for example, as part of Microsoft Viva® digest. Microsoft Viva®, being a suite of employee experience tools, does not have a single unified output file format. However, the output formats can vary depending on the specific Viva® module. For example, Viva Engage and PowerShell allow exporting Viva Insights data in a CSV format. The user leverages the weekly Microsoft Viva® digest to analyze key trends in the working style pertaining to quiet hours, collaboration time, as well as most engaged meetings, and the like. For instance, the AI-based video summary generation pipeline 200 creates video summaries using the generative models 126 and implicit grounding on the user's content in Substrate (such as W/X/P documents), email and meeting communications, and the like, based on the semantic context 204 such as collaborators, generated output & amount of time invested, as the meta prompt listed in Table 6.

TABLE 6

Create a video summary showcasing the key highlights from my work week. Rank the highlights by involved collaborators, generated output & amount of time invested. Also call out any top behavioral patterns for me & ways I can improve my working efficiency.

The AI-based video summary generation pipeline 200 then augments a weekly Microsoft Viva® digest with the video summaries showcasing key highlights from the user's work week, while highlighting key behavioral patterns, top collaborators, and suggestions for improving work efficiency.

In yet another scenario, the AI-based video summary generation pipeline 200 creates a video summary of change logs for an online collaboration application (e.g., Loop®). For example, a scrum master runs regular standups in the online collaboration application in a joint workspace with the crew. The crew members were required to make async updates to the online collaboration workspace a day before the standup, and the updates include relevant code snippet, text and proof of concept (POC) videos showcasing progress.

The scrum master wanted to quickly review the progress made by the crew since the last standup, thus invoked the video change log feature for the Loop workspace. The AI-based video summary generation pipeline 200 leverages the video change logs and the generative models 126 using the meta prompt listed in Table 7 to summarize the multimedia content added by crew members (e.g., changes made by a specific user since 3/31) since the scrum master last viewed the workspace, to create a video summary highlighting crew member updates made to the workspace.

TABLE 7

Highlight key workspace changes since 3/31.
Summarize the changes made by user A as a short video.

The data pre-processing unit 128 may reformat or otherwise standardize the information to be included in the prompt to a standardized format that is recognized by the generative models 126. For instance, the content to be summarized may be in a non-digital format (e.g., a paper report). The generative models 126 are trained using training data in this standardized format, in some implementations, and utilizing this format for the prompts provided to the generative models 126 may improve the predictions provided by the generative models 126.

In some implementations, when the content 202 is already in the format directly processable by the generative models 126, the data pre-processing unit 128 does not need to convert the content 202. In other implementations, when the content 202 is not in the format directly processable by the generative models 126, the data pre-processing unit 128 converts the content 202 to the format directly processable by the generative models 126. Some common standardized formats recognized by a language model include plain text, Markdown, HTML, JSON, XML, and the like. In one embodiment, the system converts content data into JSON, which is a lightweight and efficient data-interchange format. In addition, ChatML document format is used to provide document context information to ChatGPT, and ChatML may be used which is a JSON-based format that allows a user to specify the conversational history, dialog state, and other contextual information.

The prompt construction unit 124 then constructs a system prompt based on the content data and/or the meta prompt, and outputs the system prompt to the language model 126a to process different data type components 202a, 202b, 202c of the content 202. In response to a video summary of content requested by a user, the system can fetch content data uploaded from one or more of the following (but not limited to) a virtual meeting and collaboration application (e.g., Microsoft Teams®), digital whiteboard application(s) (e.g., Microsoft Whiteboard®), employee experience application(s) (e.g., Microsoft Viva®), online collaboration application(s) (e.g., Microsoft Loop®), calendar application(s) (e.g., Microsoft Outlook®), email application(s) (e.g., Microsoft Outlook® email), task management application(s) (e.g., Microsoft To Do®), and teamwork planning application(s) (e.g., Microsoft Planner®), software development application(s) (e.g., Microsoft Azure®), enterprise accounting and sales application(s) (e.g., Microsoft Dynamic®, Salesforce®, or the like), social media application(s) (e.g., Facebook®, Google® Blogger®, or the like), an online encyclopedia and/or databases (e.g., Wikipedia®), and the like. In some implementations, the user can also customize content data sources according to the user's preference(s), work style(s), and the like. For example, while the prompt construction unit 124 constructs the system prompt, the system prompt can be adapted or extended based on different implementations.

In one embodiment, in response to the user prompt or a system call, either the prompt construction unit 124 or the generative models 126 retrieves content component data 202a-202c from the content 202 based on the meta prompt.

As mentioned, the LLM 126a utilizes the contextual feature data 140 (especially the semantic text) to generate the text summary 206a and/or the audio summary 206b. In addition, the LLM 126a utilizes the contextual feature data 140 (especially the semantic text) to rank and determines key words/phrases/sentences/audio sections/scenes. The contextual feature data 140 can include places, events, other relevant documents, a title of the content, a topic of the content, a time when the content was captured, a location where the content was captured, an event captured in the content, roles of participants captured in the content, relationship of the participants, styles, names, team data, employee location data, individual employee's work preferences, and/or collaboration data obtained via organizational graph data, telemetry data, and the like. In one embodiment, the system extracts the contextual feature data 140 from meta data of the content. In another embodiment, the system retrieves sensor data (e.g., the sensor data 116), from the client device (e.g., the client device 105), to determine the contextual feature data 140.

In some implementations, the prompt construction unit 124 may submit further prompts to re-generate a video summary of content(s) based on user feedback. The prompt construction unit 124 can store the contextual feature data 140 for the duration of the user session in which the user uses the native application 114 or the browser application 112. A technical benefit of this approach is that the contextual feature data 140 does not need to be retrieved each time that the user submits a natural language prompt to generate a video summary of content. The request processing unit 122 maintains user session information in a persistent memory of the application services platform 110 and retrieves the contextual feature data 140 from the user session information in response to each subsequent prompt submitted by the user. The request processing unit 122 then provides the newly received user prompt and the contextual feature data 140 to the prompt construction unit 124 to construct the prompt as discussed in the preceding examples.

All the above-discussed contextual feature data 140, content and content component data 142, request, prompts and responses 144, sound/visual analysis data 146, and video summary data 148 can be stored in the enterprise data storage 134. The enterprise data storage 134 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCl), network virtualization and software-defined networking (SDN), container storage, and the like.

Since the video summary creation involves use of a generative AI which utilizes user content such as user voice and videos, personal data privacy and data ownership guidelines are taken into consideration. There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In an example, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative models 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative models 126, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

Figure 3A:
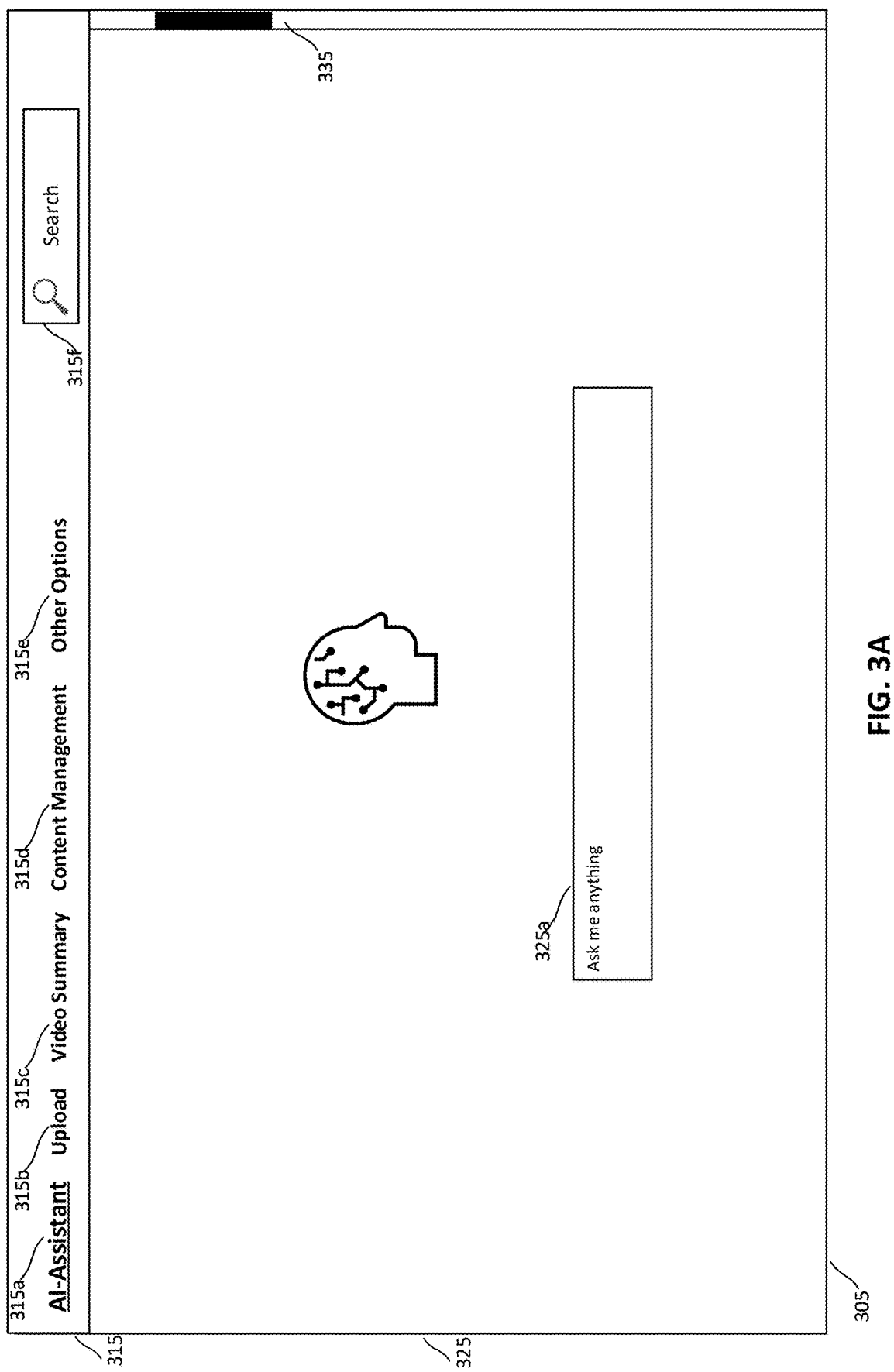
FIGS. 3A-3C are diagrams of example user interfaces of an AI-based content generation application that implements the techniques described herein.
Figure 3B:
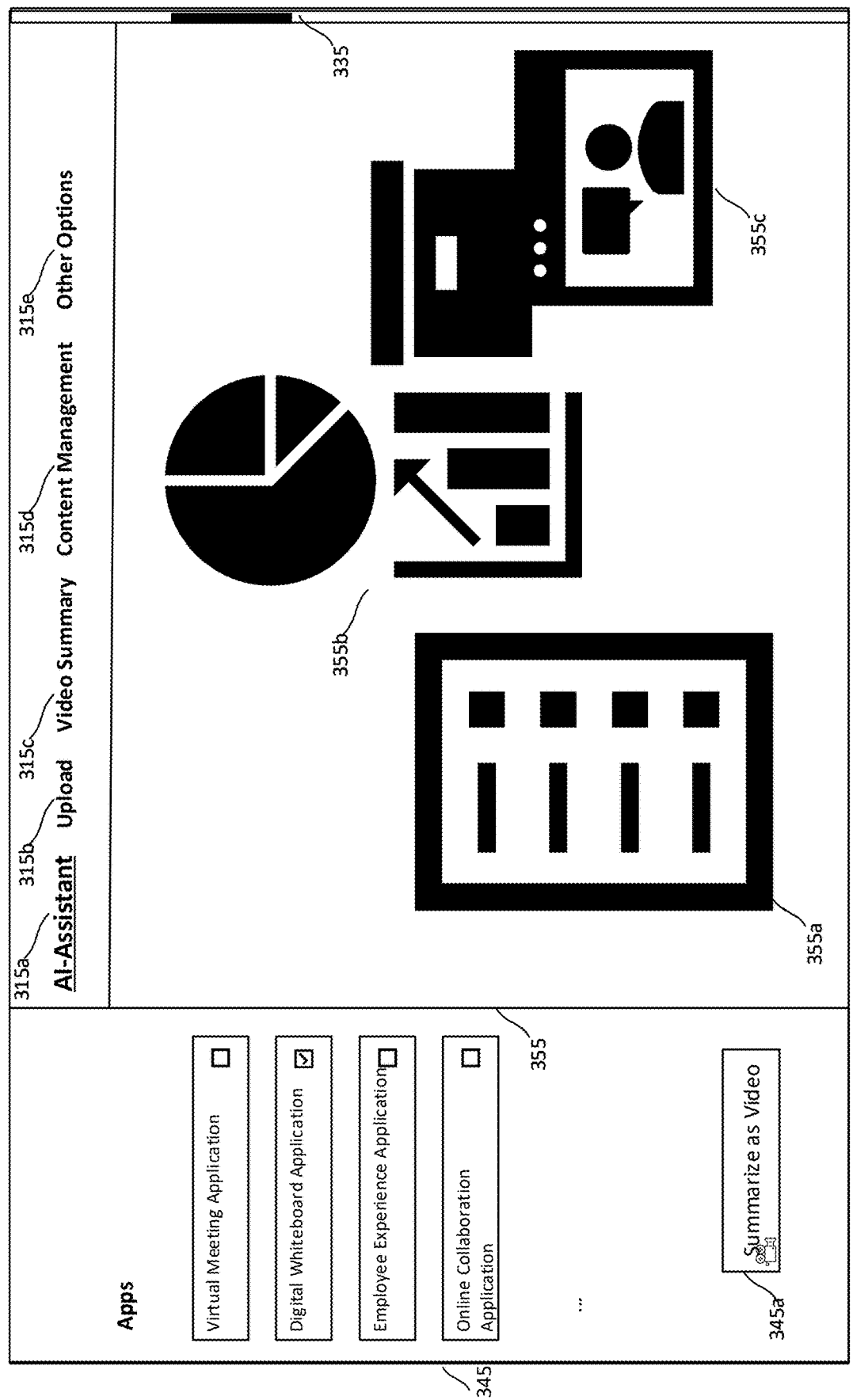
Figure 3C:
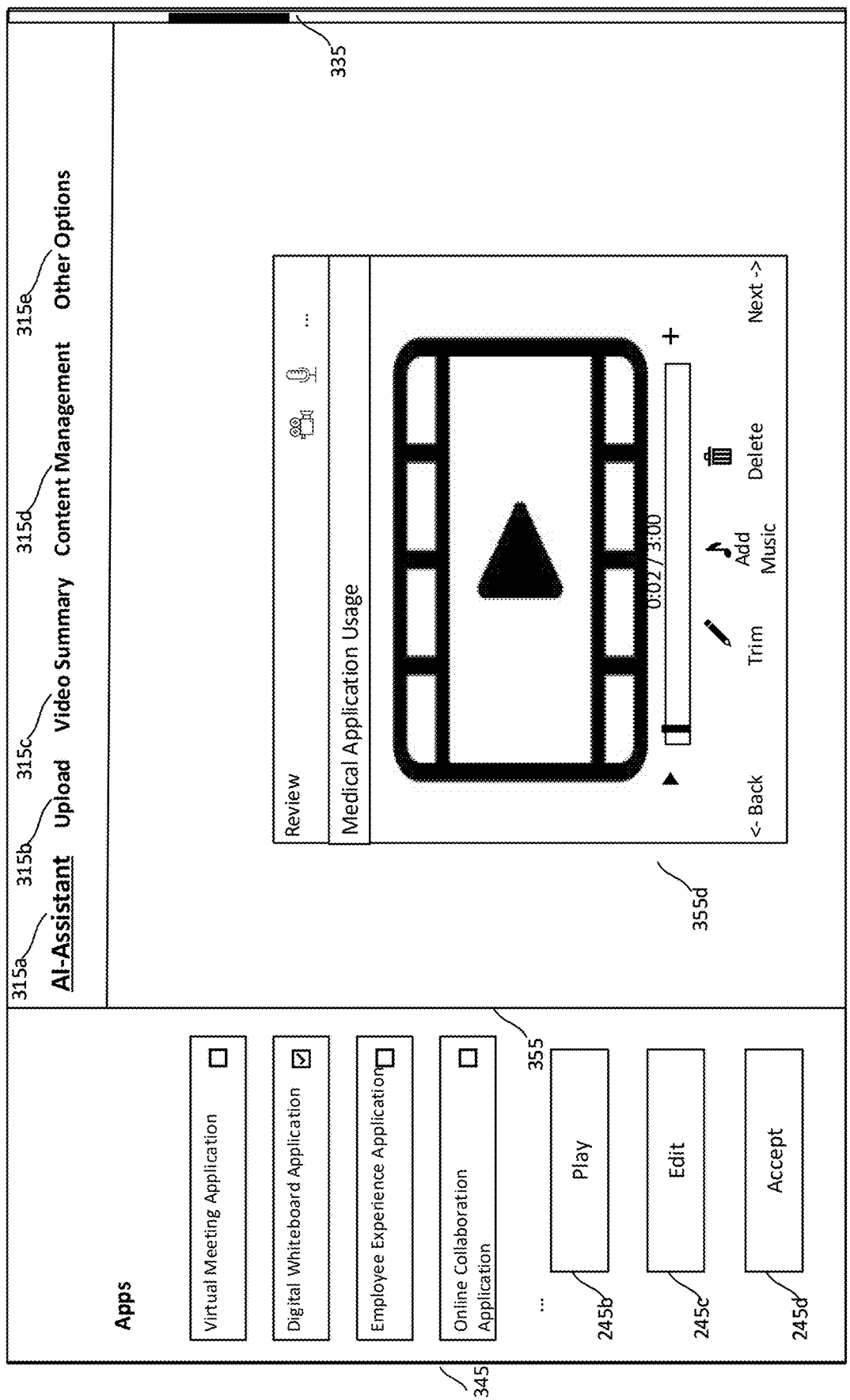

FIGS. 3A-3C are diagrams of an example user interface of an AI-based content generation application that implements the techniques described herein. The example user interface shown in FIGS. 3A-3C is a user interface of an AI-based content generation application, such as but not limited to Microsoft Copilot®. However, the techniques herein for providing AI-based video summary generation are not limited to use in the AI-based content generation application and may be used to generate video summaries of content for other types of applications including but not limited to presentation applications, website authoring applications, collaboration platforms, communications platforms, and/or other types of applications in which users create, view, and/or modify various types of video summaries of content. Such applications can be a stand-alone application, or a plug-in of any application on the client device 105, such as the browser application 112, the native application 114, and the like. For example, the system can work on the web or within a virtual meeting and collaboration application (e.g., MICROSOFT TEAMS®) or an email application (e.g., OUTLOOK®). The system can be integrated into the MICROSOFT VIVA® platform or could work within a browser (e.g., WINDOWS® EDGE®), or MICROSOFT COPILOT®. The system can also work within a website chat functionality (e.g., the BING® chat functionality).

FIG. 3A shows an example of the user interface 305 of an AI-based content generation application in which the user is interacting with an AI generative model to generate a video summary of content. The user interface 305 includes a control pane 315, a chat pane 325 and a scrollbar 335. The user interface 305 may be implemented by the native application 114 and/or the browser application 112.

In some implementations, the control pane 315 includes an AI-Assistant button 315a, an Upload button 315b, a Video Summary button 315c, a Content Management button 315d, an Other Options button 315e, and a search field 315f. The AI-Assistant button 315a can be selected to provide content generation functions. In some implementations, the chat pane 325 provides a workspace in which the user can enter prompts in the AI-based content generation application. The chat pane 325 also includes a new prompt enter box 325a enabling the user to enter a natural language prompt. In the example shown in FIG. 3A, the new prompt enter box 325a shows "Ask me anything."

User prompts usually describe content that the user would like to have automatically generated by the generative models 126 of the application services platform 110. The application submits the natural language prompt to the application services platform 110 and user information identifying the user of the application to the application services platform 110. The application services platform 110 processes the request according to the techniques provided herein to generate content and/or a video summary of the content according to the user prompt.

In FIG. 3A, since there is no content in the chat pane 325, the user selects the Upload button 315b to upload content to be summarized. In response to a user selection of the Upload button 315b, the UI 305 in FIG. 3B shows an application pane 345 with a list of applications for the user to update the content for video summary creation. For example, the application pane 345 lists a virtual meeting application (e.g., Teams®), a digital whiteboard application (e.g., Whiteboard®), an employee experience application (e.g., Viva®), an online collaboration application (e.g., Loop®), and the like. The user can upload text/audio/video/other files from one or more of the applications to generate one video summary. In this example, the user checks the box of the digital whiteboard application (e.g., Whiteboard®) to upload content.

Alternatively, one user opens the Whiteboard application, adds a "Topic Brainstorm" template, then other users co-refine the content of the template, and then invoke the summarize-as-video functionality.

FIG. 3B depicts a content pane 355 with three content items which include an industrial magazine article 355a, digital whiteboard images of financial PowerPoint slides 355b, and marketing videos 355c for the scenario of "drafting a marketing plan for a pharma company" as discussed. After the user finishes uploading content, the user can select a Summarize as Video button 345a to execute the video summary creation. In FIG. 3C, the UI 305 shows a video summary 355d of the content items 355a-355c based on the embodiment described above. The user can select a Play button 245b to play the video summary 355d, an Edit button 245c to edit the video summary 355d, and/or select an Accept button 245d to accept the video summary 355d. Alternatively, the user can select the Content Management button 315d to get a dropdown list including the functions of Play, Edit, Accept, and the like.

In some implementations, the system provides a feedback loop by augmenting thumbs up and thumbs down buttons for each video summary in the user interface 305. If the user dislikes a video summary, the system can ask why and use the input to improve the video summary. A thumbs down click could also prompt the user to indicate whether the video summary was too long, too short, missing key word/phase/points/audio section/scene, and the like.

The user prompts, the content, and the user feedback are submitted to the application services platform 110 to re-generate a video summary using the generative models 126 and/or to improve the generative models 126. The AI-based video summary generation pipeline 200 thus incorporates user feedback in real-time or in substantially real-time, and allows user edits via intuitive user interfaces.

In some implementations, the application services platform 110 includes a moderation services that analyze user prompt(s), user feedbacks, and video summaries generated by the generative models 126, to ensure that potentially objectionable or offensive content is not generated or utilized by the application services platform 110.

If potentially objectionable or offensive content is detected in the user prompt(s), the user feedbacks, and the video summaries, the moderation services provides a blocked content notification to the client device 105 indicating that the prompt(s), the user data is blocked from forming the system prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative models 126 as an input.

In one embodiment, the prompt construction unit 124 submits the user prompt(s), and/or the system prompt to the moderation services to ensure that the prompt does not include any potentially objectionable or offensive content. The prompt construction unit 124 halts the processing of the user prompt(s), and/or the system prompt in response to the moderation services determining that the user prompt(s) and/or the video summary of content data includes potentially objectionable or offensive content. As discussed in the preceding examples, the moderation services generates a blocked content notification in response to determining that the user prompt(s), and/or the system prompt includes potentially objectionable or offensive content, and the notification is provided to the native application 114 or the browser application 112 so that the notification can be presented to the user on the client device 105. For instance, the user may attempt to revise and resubmit the user prompt(s). As another example, the system may generate another system prompt after removing task data associated with the potentially objectionable or offensive content.

The moderation services can be implemented by a machine learning model trained to analyze the content of these various inputs and/or outputs to perform a semantic analysis on the content to predict whether the content includes potentially objectionable or offensive content. The moderation services can perform another check on the content using a machine learning model configured to analyze the words and/or phrase used in content to identify potentially offensive language/image/sound. The moderation services can compare the language used in the content with a list of prohibited terms/images/sounds including known offensive words and/or phrases, images, sounds, and the like. The moderation services can provide a dynamic list that can be quickly updated by administrators to add additional prohibited terms/images/sounds. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services may vary from implementation to implementation. If one or more of these checks determines that the textual content includes offensive content, the moderation services can notify the application services platform 110 that some action should be taken.

In some implementations, the moderation services generates a blocked content notification, which is provided to the client device 105. The native application 114 or the browser application 112 receives the notification and presents a message on a user interface of the application that the user prompt received by the request processing unit 122 could not be processed. The user interface provides information indicating why the blocked content notification was issued in some implementations. The user may attempt to refine a natural language prompt to remove the potentially offensive content. A technical benefit of this approach is that the moderation services provides safeguards against both user-created and model-created content to ensure that prohibited offensive or potentially offensive content is not presented to the user in the native application 114 or the browser application 112.

As mentioned, the application services platform 110 complies with privacy guidelines and regulations that apply to the usage of user data included in the content to be summarized in a video to ensure that users have control over how the application services platform 110 utilizes their data. The user is provided with an opportunity to opt into the application services platform 110 to allow the application services platform 110 to access the user data and enable the generative models 126 to generate a video summary of the content according to user consent. In some implementations, the first time that an application, such as the native application 114 or the browser application 112 presents the data analysis assistant to the user, the user is presented with a message that indicates that the user may opt into allowing the application services platform 110 to use user data included in the content to support the video summary functionality. The user may opt into allowing the application services platform 110 to access all or a subset of user data included in the content to be summarized in a video. Furthermore, the user may modify their opt-in status at any time by selectively opting into or opting out of allowing the application services platform 110 from accessing and utilizing user data from the content as a whole or individually.

Figure 4:
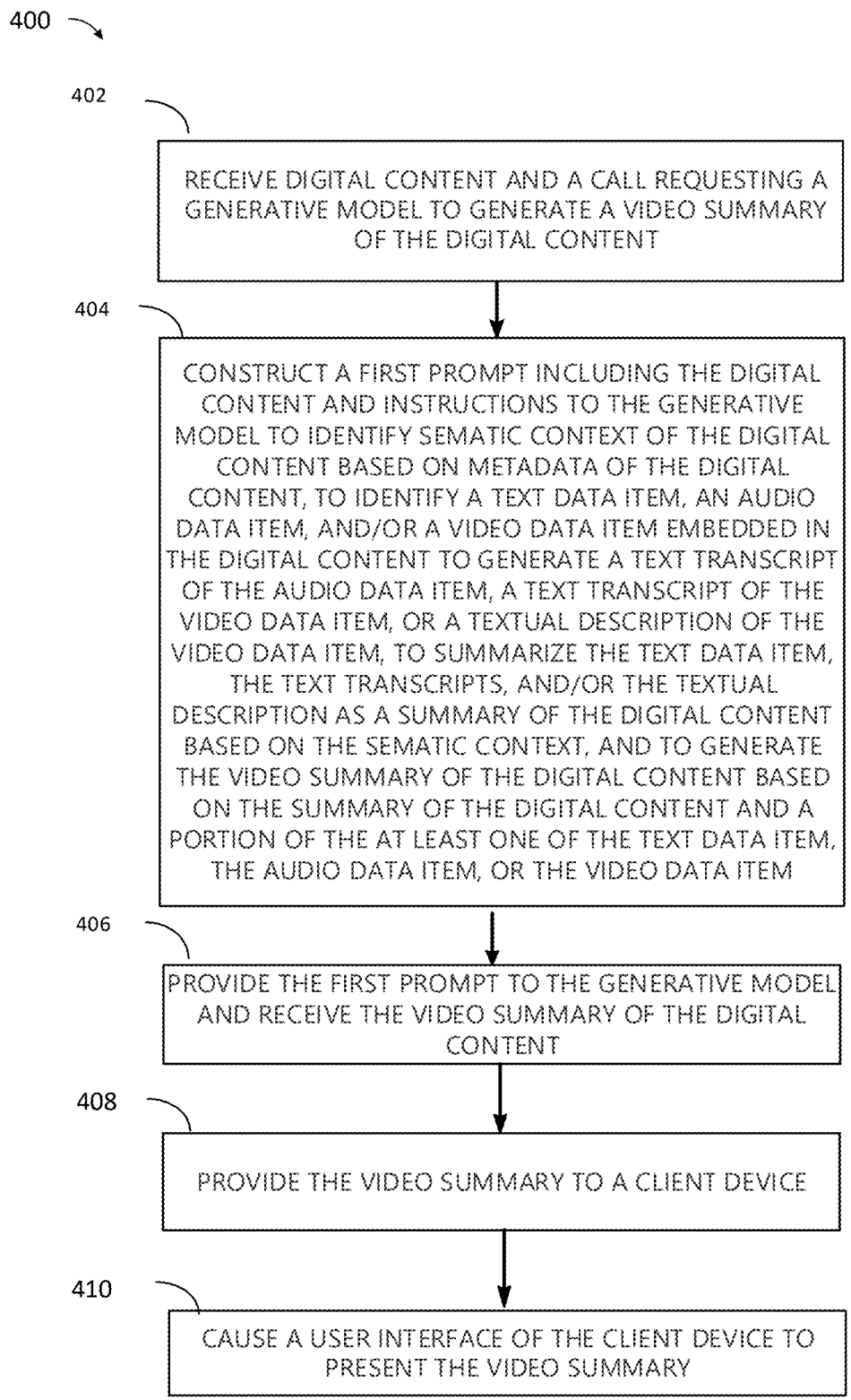
FIG. 4 is a flow chart of an example process for providing AI-based video summary generation according to the techniques disclosed herein.
Figure 6:
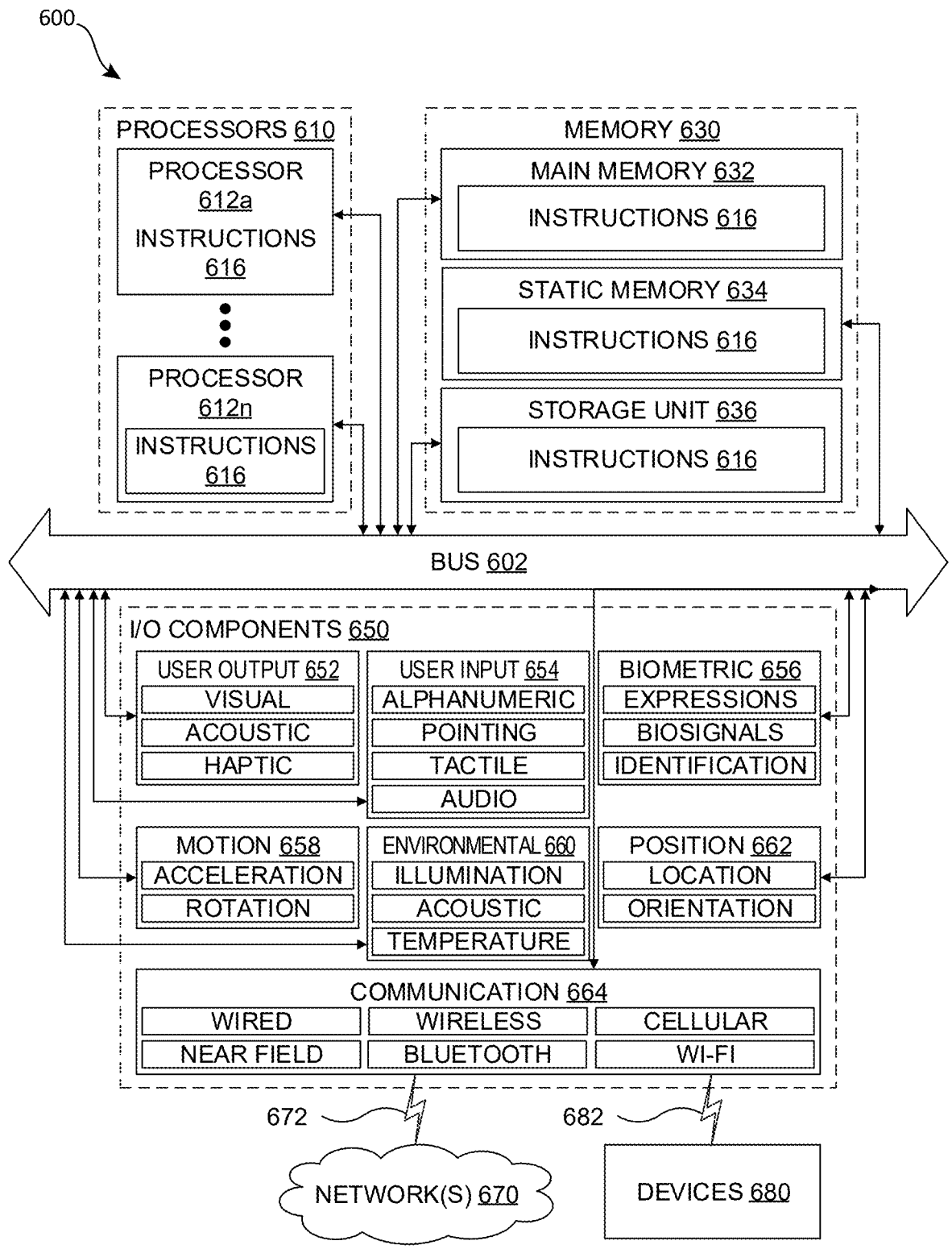
FIG. 6 is a block diagram showing components of an example machine configured to read instructions from a machine-readable medium and perform any of the features described herein.

FIG. 4 is a flow chart of an example process for AI-based video summary creation according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In one embodiment, for example, in step 402, a request processing unit (e.g., the request processing unit 122) receives, via a client device (e.g., the client device 105), digital content (e.g., the content 202 in FIGS. 2A-2B) and a call requesting a generative model (e.g., the LMM 126b) to generate a video summary (e.g., the video/multimedia summary 214 in FIG./2A, the video summary 355d in FIG. 3C) of the digital content, while the digital content includes any of text, audio, or video. In some implementations, the digital content and the call are received via a software application, and the software application is a virtual meeting and collaboration application (e.g., Microsoft Teams®), a digital whiteboard application (e.g., Microsoft Whiteboard®), an employee experience application (e.g., Microsoft Viva®), an online collaboration application (e.g., Microsoft Loop®), a calendar application (e.g., Microsoft Outlook®), an email application (e.g., Microsoft Outlook® email), a task management application (e.g., Microsoft To Do®), a team-work planning application (e.g., Microsoft Planner®), a software development application (e.g., Microsoft Azure®), an enterprise accounting and sales application (e.g., Microsoft Dynamic®), a social media application (e.g., Facebook®), or an online encyclopedia and/or database (e.g., Wikipedia®).

In step 404, a prompt construction unit (e.g., the prompt construction unit 124) constructs a first prompt by appending the digital content to a first instruction string, the first instruction string including instructions to the generative model to identify semantic context (e.g., the semantic context 204) of the digital content based on metadata of the digital content, to identify at least one of a text data item (e.g., the text content 202a, such as the industrial magazine article 355a), an audio data item (e.g., the audio content 202b, such as an audio recording), or a video data item (e.g., the video content 202c, such as the digital whiteboard images of financial PowerPoint slides 355b, and the marketing videos 355c) embedded in the digital content to generate a text transcript (e.g., the text transcript 202b-1) of the audio data item, a text transcript (e.g., the text transcript 202c-1) of the video data item, or a textual description of the video data item (e.g., the text description 202c-2, such as a text description of the digital whiteboard images of financial PowerPoint slides 355*b*), to summarize at least one of the text data item, the text transcripts, or the textual description as a summary (e.g., the text summary 206*a*) of the digital content based on the semantic context (e.g., people, places, events, other relevant attributes), and to generate the video summary of the digital content based on the summary of the digital content and a portion (e.g., a key word/phase/sentence/audio section/video scene) of the at least one of the text data item, the audio data item, or the video data item. In step 406, the prompt construction unit provides as an input the first prompt to the generative model and receiving as an output the video summary of the digital content from the generative model.

In an example, the semantic context of the digital content includes at least one of a title of the digital content, a topic of the digital content, a time when the digital content was captured, a location where the digital content was captured, an event captured in the digital content, roles of participants captured in the digital content, or relationship of the participants. In one embodiment, the generative model is a multimodal model (e.g., the LMM 126*b*) that handle all of the instructions in the first instruction string. In another embodiment, the LLM 126*a* handles most of the instructions in the first instruction string except for generating the video summary that is left for the LVM 126*c* (e.g., Dalle-E, Sora, or the like) to handle.

In another embedment, the first instruction string includes instructions to the generative model to determine a list of keywords for the digital content based on at least one of the semantic context, a number of times a keyword mentioned in the digital content, or a length of time the keyword rendered in the digital content. To summarize the at least one of the text data item, the text transcripts, or the textual description includes searching for the list of keywords therein, retrieving sentences including one or more of the keywords, ranking the sentences based on the semantic context, and combining top-ranked sentences into the summary of the digital content.

In yet another embedment, the first instruction string includes instructions to the generative model to add one or more words with a meaning of importance (e.g., important, significant, crucial, critical, major, vital, or the like) to the list of keywords. As such, the LLM 126*a* can capture a key sentence/audio section/video scene based on the words with a meaning of importance.

In one embodiment, the first instruction string includes instructions to the generative model to analyze one or more speeches (e.g., audio section(s) 202*b*-1, audio section(s) 202*c*-3, or the like) of the audio data item or the video data item for one or more key talking points, and to summarize the audio data item (e.g., into an audio summary 206*b*) or the video data item further based on the one or more key talking points. In another embodiment, to analyze the one or more speeches includes analyzing at least one of tone, intonation, pitch, volume, and speaking rate of the one or more speeches (which can be extracted via the sound/speech analysis 216 and required a specially trained LMM to process).

In one embodiment, the first instruction string includes instructions to the generative model to analyze one or more scenes in the video data item for one or more key scenes, and to include the one or more key scenes in the video summary of the digital content. In another embodiment, to analyze the one or more scenes includes to analyze at least one of color, motion, object, participant change among the one or more scenes (which can be extracted via the visual analysis 218 and required a specially trained LMM to process).

In step 408, the request processing unit provides the video summary to the client device. In step 410, the request processing unit causes a user interface (e.g., the user interface 305 in FIGS. 3A-3B) of the client device to present the video summary. In one embodiment, the request processing unit causes the user interface to receive a confirmation of the video summary from a user (e.g., a user selection of the Accept button 245*d* to accept the video summary 355*d*), and causes a publication of the video summary. In some implementations, the request processing unit works in conjunction with the editing unit 130 to cause the user interface to receive a comment or annotation from a user to edit the video summary (e.g., a user selection of the Edit button 245*c* to accept the video summary 355*d*), or causes the user interface to present interactive elements for the user to edit the video summary. For instance, the editing unit 130 works in conjunction with the request processing unit 122 to interact with users through a graphical user interface (GUI), providing a visual workspace for manipulating video and audio elements. In FIG. 3C, the content pane 355 shows a timeline (e.g., 3 minutes), a preview window, and various editing tools (e.g., trim, add music, delete). The timeline represents the video summary duration to be edited in a linear sequence. The preview window shows the video summary to edit. Additional tools can include arranging and reordering, transitions, effects and filters, text and titles, or the like.

Therefore, the system can assist users to generate a video summary of content, via a chat interface. Such interactive, chat-based video summary of content can help a user to quickly understand the content. In particular, the system supports generating effective system prompts with extracted text/audio summary data from different content components, and such system prompts are clear, concise, and provide enough context for the generative models to generate the video summary of content. In addition, the system provides users interactive tools to change/refine the video summary of content, and then share/publish the video summary of content.

For example, the system uses generative AI to create a daily video summary of content for an individual. Each task is assigned a discrete timeslot and includes a set of inferred actions that provide context and relevant documentation to help the user perform the task. The user can use the AI-based content generation application at the start of a day and view a video summary of content of tasks and suggested actions to complete each task. In this way, the user no longer needs to look through the disparate task sources and work out how to divide the time among the tasks.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
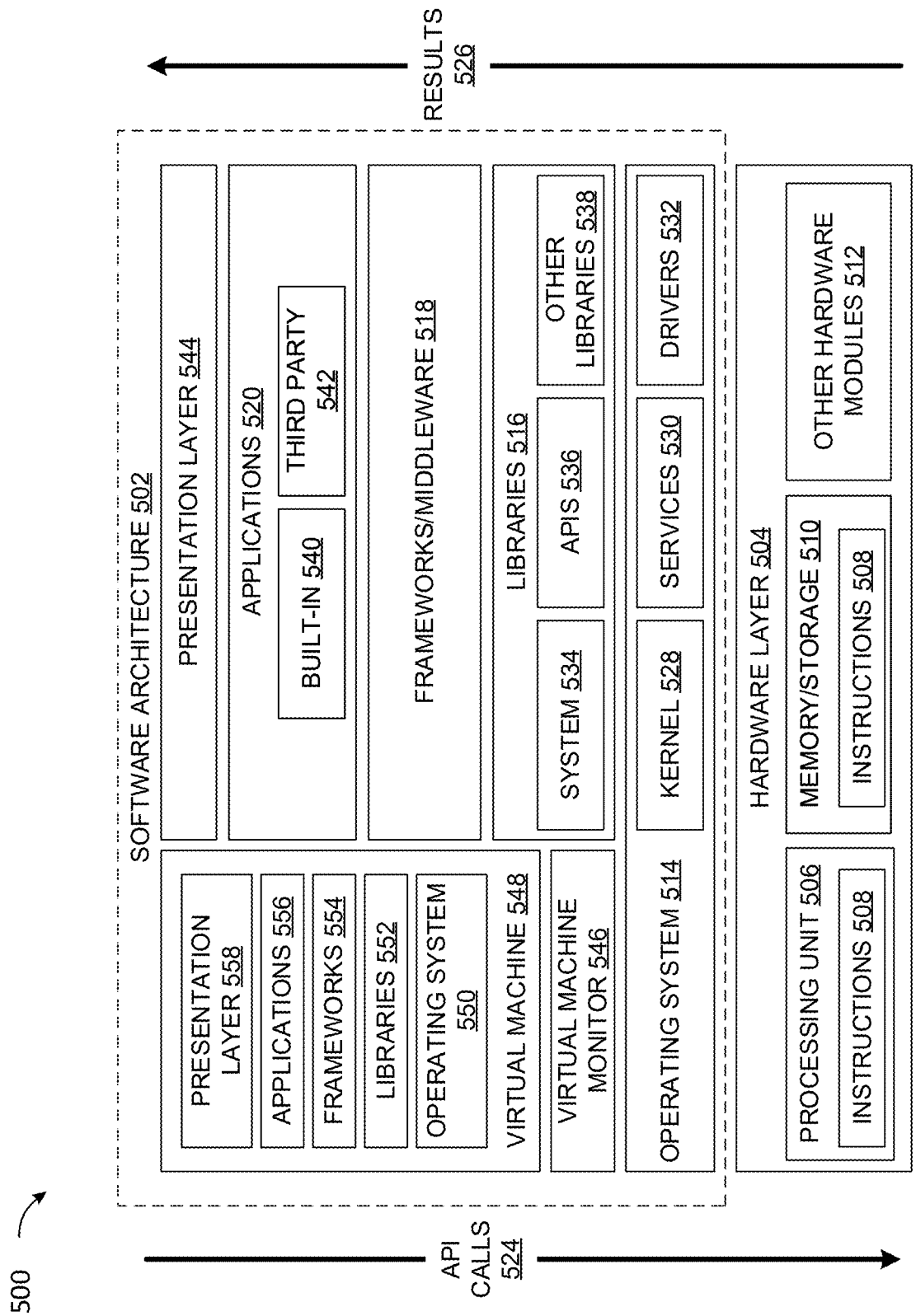
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor alone or in combination with other processors to perform operations of:
   receiving, via a client device, digital content and a call requesting a generative model to generate a video summary of the digital content, wherein the digital content includes any of text, audio, or video;
   constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item;
   providing, via the prompt construction unit, as an input the first prompt to the generative model and receiving as an output the video summary of the digital content from the generative model;
   providing the video summary to the client device; and
   causing a user interface of the client device to present the video summary.

2. The data processing system of claim 1, wherein the machine-readable storage medium further includes instructions configured to cause the processor alone or in combination with other processors to perform at least one of the operations of:
   causing the user interface to receive a comment or annotation from a user to edit the video summary, or
   causing the user interface to present interactive elements for the user to edit the video summary.

3. The data processing system of claim 1, wherein the machine-readable storage medium further includes instructions configured to cause the processor alone or in combination with other processors to perform operations of:
   causing the user interface to receive a confirmation of the video summary from a user; and
   causing a publication of the video summary.

4. The data processing system of claim 1, wherein the first instruction string includes instructions to the generative model to determine a list of keywords for the digital content based on at least one of the semantic context, a number of times a keyword mentioned in the digital content, or a length of time the keyword rendered in the digital content, and
   wherein to summarize the at least one of the text data item, the text transcripts, or the textual description includes to search for the list of keywords therein, to retrieve sentences including one or more of the keywords, to rank the sentences based on the semantic context, and to combine top-ranked sentences into the summary of the digital content.

5. The data processing system of claim 4, wherein the first instruction string includes instructions to the generative model to add one or more words with a meaning of importance to the list of keywords.

6. The data processing system of claim 1, wherein the semantic context of the digital content includes at least one of a title of the digital content, a topic of the digital content, a time when the digital content was captured, a location where the digital content was captured, an event captured in the digital content, roles of participants captured in the digital content, or relationship of the participants.

7. The data processing system of claim 1, wherein the first instruction string includes instructions to the generative model to analyze one or more speeches of the audio data item or the video data item for one or more key talking points, and to summarize the audio data item or the video data item further based on the one or more key talking points.

8. The data processing system of claim 7, wherein to analyze the one or more speeches includes to analyze at least one of tone, intonation, pitch, volume, and speaking rate of the one or more speeches.

9. The data processing system of claim 1, wherein the first instruction string includes instructions to the generative model to analyze one or more scenes in the video data item for one or more key scenes, and to include the one or more key scenes in the video summary of the digital content.

10. The data processing system of claim 9, wherein to analyze the one or more scenes includes to analyze at least one of color, motion, object, participant change among the one or more scenes.

11. The data processing system of claim 1, wherein the generative model is a multimodal model.

12. The data processing system of claim 1, wherein the digital content and the call are received via a software application, and wherein the software application is a virtual meeting and collaboration application, a digital whiteboard application, an employee experience application, an online collaboration application, a calendar application, an email application, a task management application, a team-work planning application, a software development application, an enterprise accounting and sales application, a social media application, or an online encyclopedia.

13. A method comprising:
receiving, via a client device, digital content and a call requesting a generative model to generate a video summary of the digital content, wherein the digital content includes any of text, audio, or video;
constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item;
providing, via the prompt construction unit, as an input the first prompt to the generative model and receiving as an output the video summary of the digital content from the generative model;
providing the video summary to the client device; and
causing a user interface of the client device to present the video summary.

14. The method of claim 13, further comprising:
causing the user interface to receive a comment or annotation from a user to edit the video summary, or
causing the user interface to present interactive elements for the user to edit the video summary.

15. The method of claim 13, further comprising:
causing the user interface to receive a confirmation of the video summary from a user; and
causing a publication of the video summary.

16. The method of claim 13, wherein the first instruction string includes instructions to the generative model to determine a list of keywords for the digital content based on at least one of the semantic context, a number of times a keyword mentioned in the digital content, or a length of time the keyword rendered in the digital content, and
wherein to summarize the at least one of the text data item, the text transcripts, or the textual description includes to search for the list of keywords therein, to retrieve sentences including one or more of the keywords, to rank the sentences based on the semantic context, and to combine top-ranked sentences into the summary of the digital content.

17. A non-transitory computer readable medium on which are stored instructions that, when executed, cause a programmable device to perform functions of:
receiving, via a client device, digital content and a call requesting a generative model to generate a video summary of the digital content, wherein the digital content includes any of text, audio, or video;
constructing, via a prompt construction unit, a first prompt by appending the digital content to a first instruction string, the first instruction string including instructions to the generative model to identify semantic context of the digital content based on metadata of the digital content, to identify at least one of a text data item, an audio data item, or a video data item embedded in the digital content to generate a text transcript of the audio data item, a text transcript of the video data item, or a textual description of the video data item, to summarize at least one of the text data item, the text transcripts, or the textual description as a summary of the digital content based on the semantic context, and to generate the video summary of the digital content based on the summary of the digital content and a portion of the at least one of the text data item, the audio data item, or the video data item;
providing, via the prompt construction unit, as an input the first prompt to the generative model and receiving as an output the video summary of the digital content from the generative model;
providing the video summary to the client device; and
causing a user interface of the client device to present the video summary.

18. The non-transitory computer readable medium of claim 17, wherein the instructions when executed, further cause the programmable device to perform functions of:
causing the user interface to receive a comment or annotation from a user to edit the video summary, or
causing the user interface to present interactive elements for the user to edit the video summary.

19. The non-transitory computer readable medium of claim 17, wherein the instructions when executed, further cause the programmable device to perform functions of:
causing the user interface to receive a confirmation of the video summary from a user; and
causing a publication of the video summary.

20. The non-transitory computer readable medium of claim 17, wherein the first instruction string includes instructions to the generative model to determine a list of keywords for the digital content based on at least one of the semantic context, a number of times a keyword mentioned in the digital content, or a length of time the keyword rendered in the digital content, and wherein to summarize the at least one of the text data item, the text transcripts, or the textual description includes to search for the list of keywords therein, to retrieve sentences including one or more of the keywords, to rank the sentences based on the semantic context, and to combine top-ranked sentences into the summary of the digital content.

* * * * *